No. 881,738. PATENTED MAR. 10, 1908.
A. H. STILLWAGEN.
PIE CUTTER AND CRIMPER.
APPLICATION FILED MAY 17, 1907.
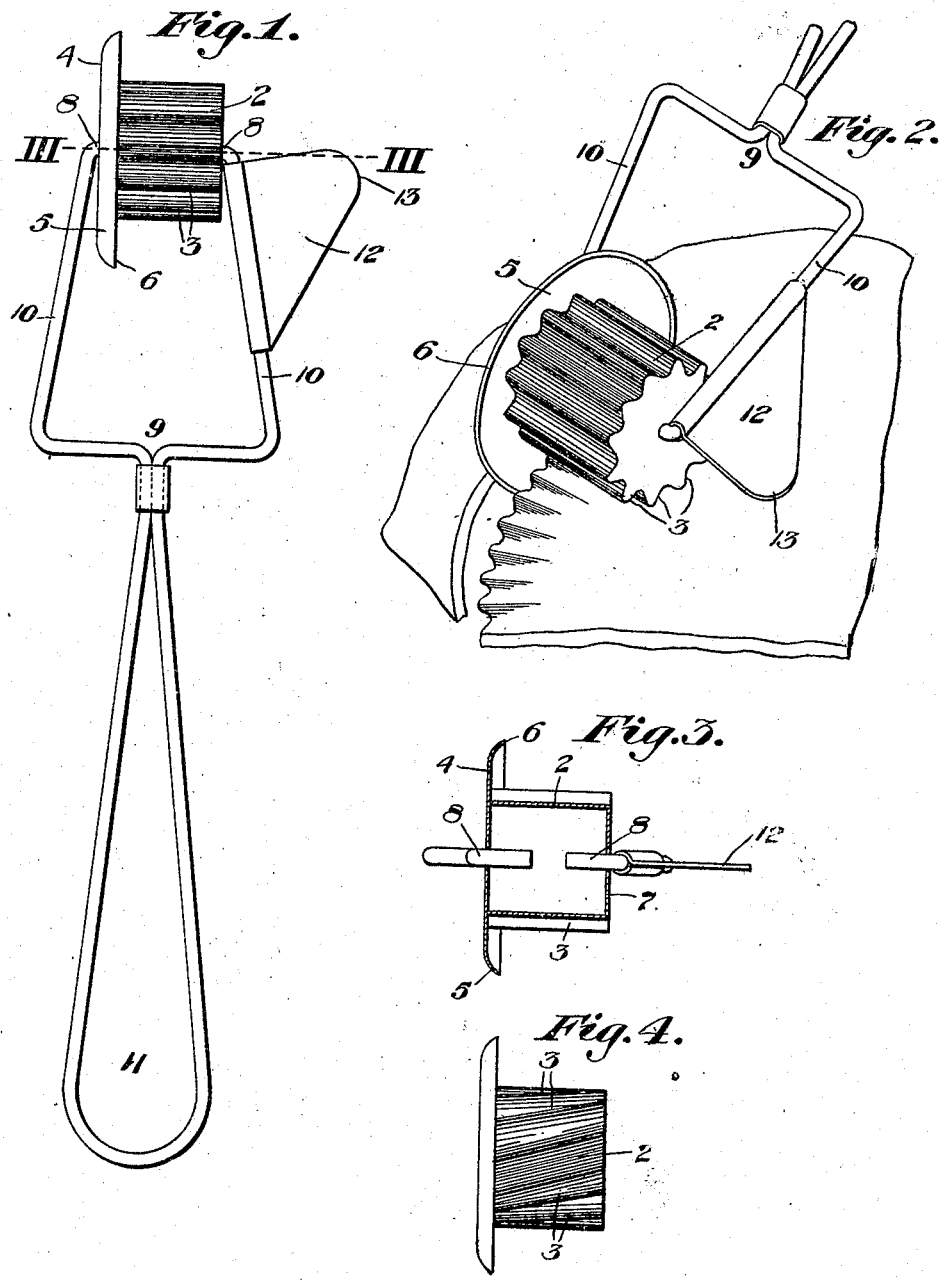
Witnesses:
Inventor:

UNITED STATES PATENT OFFICE.

ALEXANDER H. STILLWAGEN, OF PITTSBURG, PENNSYLVANIA.

PIE CUTTER AND CRIMPER.

No. 881,738.  Specification of Letters Patent.  Patented March 10, 1908.

Application filed May 17, 1907. Serial No. 374,125.

*To all whom it may concern:*

Be it known that I, ALEXANDER H. STILLWAGEN, a citizen of the United States, residing at Pittsburg, in the county of Allegheny and State of Pennsylvania, have invented certain new and useful Improvements in Pie Cutters and Crimpers, of which the following is a specification, reference being had therein to the accompanying drawing.

My invention refers to improvements in pie cutters and crimpers, and is designed to provide an article for use by bakers adapted to cut the surplus dough from around the outside of a pie in the pan, and at the same time crimp the upper edge of the pie, the device also being provided with a supplemental laterally extending dough cutter in the form of a knife edge, as shall be more fully hereinafter described.

Referring to the drawing: Figure 1 represents the device in side elevation. Fig. 2 is a perspective view, illustrating the operation. Fig. 3 is a cross sectional view on the line III. III. of Fig. 1. Fig. 4 is a detail view in elevation of the rotatable cutter and crimper showing spirally arranged crimping flutes.

The principal operative element of the device consists of a barrel-shaped crimper 2 formed of thin tin plate or other metal, having the transversely arranged crimping flutes 3 formed by corrugating the metal in any desired manner, either by V shaped or U shaped corrugations, according to the desired design of the crimps.

4 is the cutter in the form of a disk having its edge 5 rounded or bent inwardly toward the crimper in dished form as indicated, and terminating in the cutting edge 6, as clearly shown. A particular advantage of thus forming the cutter, is that in operation it will more closely conform to the outer edge of the pie plate, insuring an accurate cutting of the dough and giving a finished circular edge.

The crimping roller and cutting disks are connected together by soldering or otherwise, the body portion of the disk forming one end of the assembled rotating tool, while the other end of the crimping roll 3 is closed by an end plate 7, all of said parts being soldered or otherwise connected together.

As thus made the crimping and cutting element is rotatably mounted upon terminals 8, 8 of a wire holding frame 9, having the side shanks 10, 10, as shown and a holding handle 11 of any suitable form. The frame and handle may be of other material or otherwise made and the operation of the invention does not particularly depend upon the construction or form of the handle itself.

12 represents a straight cutting blade mounted upon one of the shanks 10 preferably terminating in a rounded extremity 13, and adapted for use in cutting dough in the ordinary manner.

In Fig. 4 I have shown a modified arrangement of the corrugations of the crimping element 2, wherein the corrugations 3' are arranged diagonally along the periphery of said element 2 or in somewhat spiral form to give a corresponding slanting arrangement to the crimps on the upper edge of the pie crust.

It will be understood that the periphery of the crimping roller may be variously changed or modified as desired, and I do not wish to be limited to the construction above described, but to include such changes and variations, not only in the design of the roller but also in any other feature or details as are properly within the scope of the invention and the ability of any ordinary mechanic.

As thus made the device is very simple and cheap, capable of operation to perform its functions as desired, and will be found to constitute a very convenient and useful article for the purpose intended.

Having described my invention what I claim is:

In a crimping and cutting device, the combination of a rotatable corrugated roller having a circular cutting disk at one end, an end plate at the other end, a holding frame having embracing sides and inwardly turned terminals inserted centrally into the disk and end plate, and a flat cutting blade secured to one of the sides of the frame and extending laterally therefrom on a plane with the center of the roller, substantially as set forth.

In testimony whereof I affix my signature in presence of two witnesses.

ALEXANDER H. STILLWAGEN.

Witnesses:
C. M. CLARKE,
CHAS. S. LEPLEY.